United States Patent
Tsuruta et al.

(10) Patent No.: US 7,819,428 B2
(45) Date of Patent: Oct. 26, 2010

(54) VEHICLE FRAME STRUCTURE

(75) Inventors: Yuichiro Tsuruta, Saitama (JP); Masahiro Yamaguchi, Saitama (JP); Jin Osada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 11/699,781

(22) Filed: Jan. 30, 2007

(65) Prior Publication Data
US 2007/0176407 A1 Aug. 2, 2007

(30) Foreign Application Priority Data
Jan. 31, 2006 (JP) .............................. 2006-022881
Nov. 15, 2006 (JP) .............................. 2006-308831

(51) Int. Cl.
*B62D 21/11* (2006.01)
(52) U.S. Cl. ................................ 280/781; 280/124.109
(58) Field of Classification Search ................. 280/781, 280/787, 788
See application file for complete search history.

(56) References Cited

U.S. PATENT DOCUMENTS

| | | | | |
|---|---|---|---|---|
| 6,869,090 B2 * | 3/2005 | Tatsumi et al. | ........ | 280/124.109 |
| 7,434,822 B2 * | 10/2008 | Takahashi et al. | ..... | 280/124.109 |
| 7,461,851 B2 * | 12/2008 | Yamamura et al. | .... | 280/124.135 |
| 7,600,769 B2 * | 10/2009 | Bessho et al. | ......... | 280/124.109 |
| 7,690,661 B2 * | 4/2010 | Tsuruta et al. | ........ | 280/124.135 |
| 2001/0048207 A1 * | 12/2001 | Handa | .................. | 280/124.135 |
| 2003/0121711 A1 * | 7/2003 | Chiu | ........................... | 180/312 |
| 2005/0110264 A1 * | 5/2005 | Seki et al. | .................... | 280/788 |
| 2005/0253353 A1 * | 11/2005 | Yamamura et al. | .... | 280/124.135 |
| 2006/0055162 A1 * | 3/2006 | Beckmann et al. | .......... | 280/781 |
| 2006/0066068 A1 * | 3/2006 | Takahashi et al. | ..... | 280/124.109 |
| 2006/0091664 A1 * | 5/2006 | Dupuis et al. | ............... | 280/781 |
| 2006/0192375 A1 * | 8/2006 | Davis et al. | .................. | 280/781 |
| 2007/0035118 A1 * | 2/2007 | Ni et al. | ....................... | 280/797 |
| 2007/0176407 A1 * | 8/2007 | Tsuruta et al. | .............. | 280/788 |
| 2008/0169633 A1 * | 7/2008 | Gabbianelli et al. | ......... | 280/781 |

FOREIGN PATENT DOCUMENTS

JP    2001-328410    11/2001

* cited by examiner

*Primary Examiner*—Paul N Dickson
*Assistant Examiner*—Karen Jane J Amores
(74) *Attorney, Agent, or Firm*—Carrier, Blackman & Associates P.C.; William D. Blackman; Joseph P. Carrier

(57) ABSTRACT

A frame structure is provided in which a sub-frame is fixed to a rear portion of a vehicle body frame, and serves as a suspension-supporting portion of the vehicle body frame. In the sub-frame, a rear member extends between a sub-frame upper pipe and a sub-frame lower pipe. The rear member includes a rear upper arm supporting portion and a rear lower arm supporting portion, for supporting proximal ends of an upper arm and a lower arm of a rear suspension. The frame structure hereof improves accuracy and rigidity of the suspension-supporting portion of the vehicle body frame, and provides a simplified structure as compared to conventional frame structures.

14 Claims, 12 Drawing Sheets

VEHICLE FRAME STRUCTURE

CROSS-REFERENCE TO RELATED APPLICATIONS

The present invention claims priority under 35 USC 119 based on Japanese patent application Nos. 2006-022881, filed on Jan. 31, 2006 and 2006-308831, filed on Nov. 15, 2006. The subject matter of these priority documents is incorporated by reference herein.

BACKGROUND OF THE INVENTION

1. Field of the Invention

The present invention relates to a frame structure for a vehicle provided with wheels on the left and right sides of a vehicle body, such as an All Terrain Vehicle (ATV).

2. Description of the Background Art

In the vehicle frame art, a frame structure is known in which the rear portion of a vehicle body frame is formed as a sub-frame, and an independent rear suspension is supported by the sub-frame. Such a frame structure is disclosed, for example, in JP-A-2001-328410. As seen in FIG. 5 of that document, a sub-frame is disclosed which includes upper and lower separate frame members, and the lower frame member is formed into a substantially L-shape as viewed in a side view by bending and extending the rear portion thereof upward, and the rear end portion of the upper frame member is connected to a vertically intermediate portion thereof. One end side of upper and lower suspension arms of the rear suspension are supported by the upper and lower frame members. Further, a dedicated supporting pipe for supporting a terminal gear case which is arranged inside the sub-frame extends between the upper and lower frame members.

In the above-mentioned publication, members that require accuracy and rigidity are concentrated on a suspension supporting portion (sub-frame) of the vehicle body frame and, in addition, these members are required to have special shapes or parts respectively and hence, the structures of these members tend to become complicated. In view of this, a suspension supporting portion is desired in which the constituent members are simplified and less complicated.

Accordingly, the invention provides a frame structure in which accuracy and rigidity of a suspension supporting portion of a vehicle body frame are easily ensured, and the structure is simplified.

SUMMARY

In order to overcome the above-mentioned drawback, an inventive frame structure is provided. A first aspect of the invention is characterized in that the frame structure includes a vehicle body frame (for example, a vehicle body frame 4 in an embodiment), and a suspension device (for example, a rear suspension 75 in the embodiment) for suspending left and right wheels (for example, left and right rear wheels 3 in the embodiment). The suspension device includes upper and lower suspension arms (for example, an upper arm 76 and a lower arm 77 in the embodiment), and proximal ends of the respective suspension arms are supported by the vehicle body frame. In addition, a rear member (for example, a rear member 64 in the embodiment) extends between upper and lower frame members of the vehicle body frame (for example, sub-frame upper pipes 62 and sub-frame lower pipes 61 in the embodiment), and the rear member includes upper and lower supporting portions (for example, a rear upper arm supporting portion 64a, a rear lower arm supporting portion 64b in the embodiment) for supporting the proximal ends of the respective suspension arms.

According to the first aspect of the invention, the rigidity of the suspension supporting portion of the vehicle body frame is easily ensured by connecting the upper and lower frame members using the rear member. The accuracy in positioning of the respective suspension arm supporting portions is easily ensured by providing the supporting portions of the upper and lower suspension arms on a single member.

A second aspect of the invention is characterized in that the rear member is formed into a substantially angular C-shape in cross section.

According to the second aspect of the invention, the desired rigidity of the rear member is obtained, and the rear member is formed into a shape which can easily hold the respective suspension arms in a simple structure.

A third aspect of the invention is characterized in that the vehicle body frame includes a terminal gear case (for example, a rear terminal gear case 12 in the embodiment), and the rear member supports the terminal gear case.

According to the third aspect of the invention, rationalization in design of the vehicle body is achieved without requiring a dedicated member for supporting the terminal gear case by concentrating the supporting function of the terminal gear case and the respective suspension arms on the member which also serves as a reinforcing member of the vehicle body frame.

A fourth aspect of the invention is characterized in that the rear member is fitted to at least one of the respective frame members. Specifically, the frame member extends through the rear member, and then the frame and rear members are welded together.

According to the fourth aspect of the invention, a structure which easily ensures the rigidity of a joined portion between the rear member and the respective frame members is achieved.

A fifth aspect of the invention is characterized in that the rear member supports an accessory part of a vehicle body (for example, a trailer hitch 38 in the embodiment).

According to the fifth aspect of the invention, rationalization in design of the vehicle body is achieved by concentrating the supporting function of the accessory parts of the vehicle body which requires the rigidity such as a traction apparatus or a carrier supporting member on the rear member.

A sixth aspect of the invention is characterized in that the respective frame members and the rear member are provided on left and right sides of the vehicle, and a mounting member (for example, a rear lower cross member 68 in the embodiment), on which the accessory part of the vehicle body is mounted, extends between the left and right members. The respective rear members are mounted on the respective frame members in a state that the left and right rear members are connected to each other by way of the mounting member.

According to the sixth aspect of the invention, the vehicle body frame is easily assembled by assembling the left and right rear members and the mounting members to the respective frame members in a sub-assembled state in advance when integrally assembling the respective frame members, the left and right members and the mounting member.

A seventh aspect of the invention is characterized in that the vehicle body frame includes a frame body (for example, a frame body 4a in the embodiment) and a sub-frame (for example, a sub-frame 60 in the embodiment) which constitutes a body separate from the frame body. The sub-frame includes the respective frame members, the respective rear members, and the mounting member, as well as a shock absorber supporting member (for example, a center upper cross member 70 in the embodiment) extending between the left and right frame members, and a mounting portion (for example, an upper frame connecting portion 66*a* in the embodiment) of the sub-frame with respect to the frame body is provided in the vicinity of the shock absorber supporting member.

According to the seventh aspect of the invention, rationalization in design of the vehicle body is achieved by arranging the mounting portion with respect to the frame body in the vicinity of the shock absorber supporting member, which serves also as the reinforcing member of the sub-frame, and by concentrating the reinforcing function of the mounting portion with respect to the frame body on the shock absorber supporting member.

An eighth aspect of the invention is characterized in that the frame structure includes a vehicle body frame (a vehicle body frame 4 described in the embodiment, for example), and a suspension device (a rear suspension 75 described in the embodiment, for example) for suspending left and right wheels (left and right rear wheels 3 described in the embodiment, for example), in which the suspension device includes left and right suspension arms (left and right upper arms 76 described in the embodiment, for example), and proximal ends of the respective suspension arms are supported by an arm support portion (rear upper arm support portion 64*a* described in the embodiment, for example) of the vehicle body frame. The frame structure includes a stabilizer (a stabilizer 87 described in the embodiment, for example) which extends between the left and right suspension arms, and a stabilizer holding portion (a stabilizer holding bracket 188 described in an embodiment, for example) which holds an intermediate portion of the stabilizer. In addition, the stabilizer holding portion is provided astride a frame member (a sub-upper rear pipe 163 described in the embodiment, for example) of the vehicle body frame and the arm support portion.

According to the eighth aspect of the invention, the arm support portion and the stabilizer holding portion reinforce each other, thus easily ensuring the rigidity of the suspension supporting portion of the vehicle body frame.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
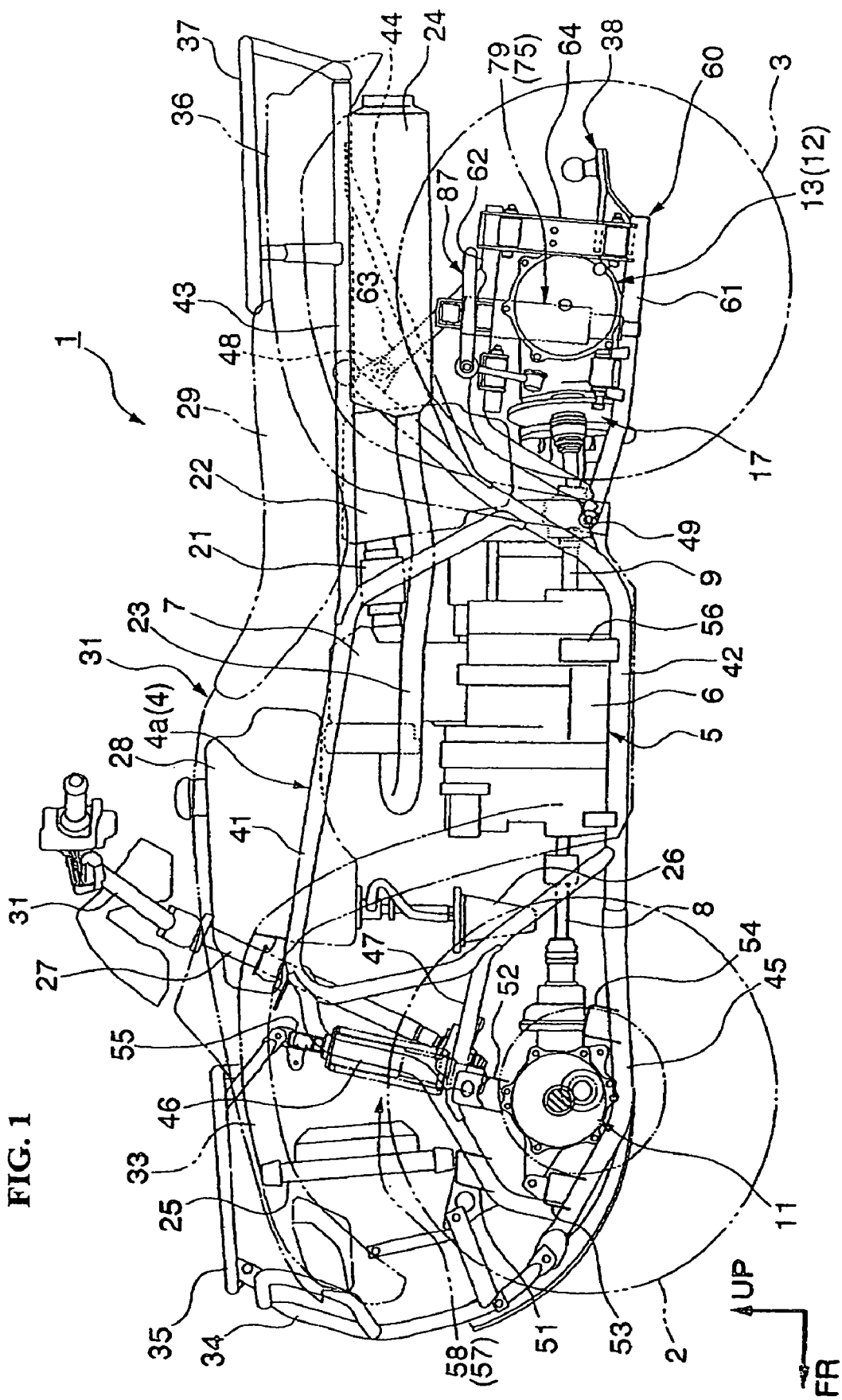
FIG. 1 is a side view of a saddle-type four-wheel vehicle including a frame structure according to an illustrative embodiment of the invention.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

In the drawings, directions of front, rear, left and right in the description given below correspond to the directions in a vehicle unless otherwise specified. An arrow FR in the drawing represents the front of the vehicle, an arrow LH represents the left of the vehicle, an arrow UP represents the upper direction of the vehicle respectively.

A first embodiment of the invention is now described with respect to a saddle-type four-wheel vehicle 1 designed for operation on rough-terrain, commonly referred to as an ATV and shown in FIG. 1. The vehicle 1 includes left and right front wheels 2 and rear wheels 3. The wheels 2, 3 are low-pressure balloon tires of relatively large diameter provided at the front and rear of the vehicle body. The vehicle body is configured to be compact and light in weight, and has a large minimum ground clearance for enhancing traveling performance mainly on the rough terrain. A vehicle body frame 4 of this saddle-type four-wheel vehicle 1 includes a separate sub-frame 60 integrally connected to the rear portion of a frame body 4*a*.

Both of the front wheels 2 are suspended by way of front suspensions 57. The front suspensions 57 are of an independent suspending type (double wishbone type). Both of the rear wheels 3 are suspended at the rear portion (sub-frame 60) of the vehicle body frame 4 by way of rear suspensions 75 of the same independent suspending type (double wishbone type) at the rear of the vehicle body frame 4 (frame body 4*a*).

An engine 5 is provided as a motor of the saddle-type four-wheel vehicle 1, and is mounted to a substantially center of the vehicle body frame 4. The engine 5 is, for example, a water-cooled single-cylinder engine. The engine 5 is arranged in a so-called vertical layout with the axis of rotation of a crankshaft oriented to extend along the longitudinal direction of the vehicle. A crankcase 6, which constitutes the lower portion of the engine 5, also serves as a transmission case, and front and rear propeller shafts 8, 9 extend out from the front and rear of the crankcase 6 toward the front or the rear respectively.

The respective propeller shafts 8, 9 are connected to both the front wheels 2 and the rear wheels 3 by way of front and rear terminal gear cases 11, 12 or the like so as to be capable of transmitting a power on the front lower side or the rear lower side of the vehicle body frame 4. The rotational power from the engine 5 is outputted to the respective propeller shafts 8, 9 by way of a transmission, not shown in the drawing, stored in the crankcase 6, and then transmitted to both front wheels 2 and rear wheels 3 by way of the respective terminal gear cases 11, 12 and left and right drive shafts and the like.

Figure 2:
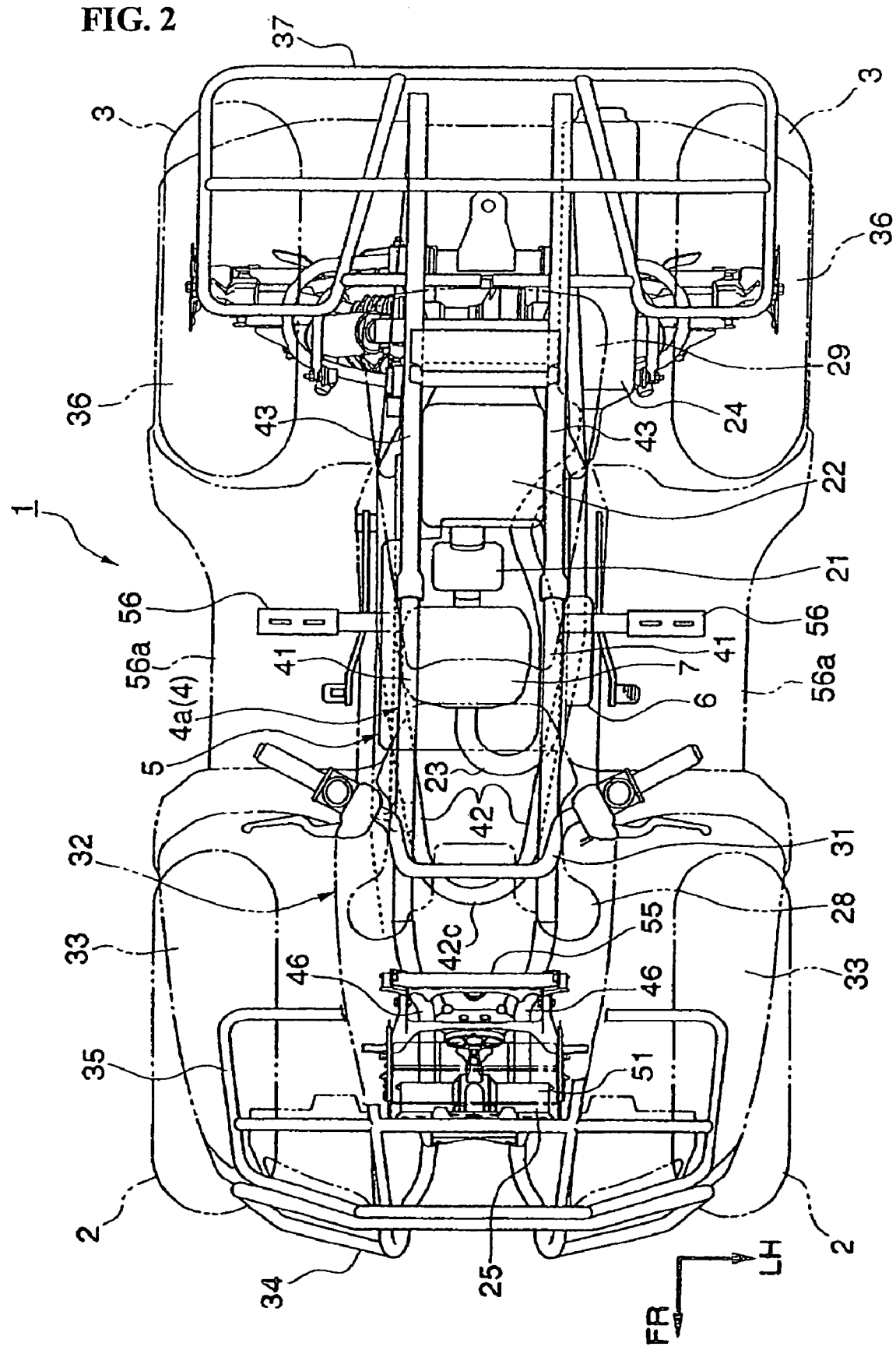
FIG. 2 is a top view of the saddle-type four-wheel vehicle.

Referring also to FIG. 2, in the engine 5, a throttle body 21 is connected to the rear portion of a cylinder portion 7 which extends upright on the crankcase 6. An air cleaner case 22 is connected to the rear portion of the throttle body 21. In addition, the proximal end portion of an exhaust pipe 23 is connected to the front portion of the cylinder portion 7. The exhaust pipe 23 extends forwardly of the cylinder portion 7, then reverses direction to extend backward along the left side of the cylinder portion 7, and is then connected at the distal end thereof to a silencer 24 on the left side on the rear portion of the vehicle body. Reference numeral 26 in FIG. 1 designates a fuel pump for pressure-feeding fuel to an injector of the throttle body 21.

In the widthwise center portion of the upper portion of the vehicle body of the saddle-type four-wheel vehicle 1, there are provided, in order from the front, a steering shaft 27, a fuel tank 28 and a saddle-type seat 29 respectively. A handle 31 having a bar-shape is positioned at an obliquely upper front position of the fuel tank 28, and is mounted to the upper end portion of the steering shaft 27. A front wheel steering mechanism, not shown in the drawing, is connected to the lower end portion of the steering shaft 27. A radiator 25 for cooling the engine 5 is disposed at the front of the lower portion of the steering shaft 27.

A vehicle body cover 32 is formed of resin and covers the front portion of the vehicle body as needed. A front fender 33, also formed of resin, covers both of the front wheels 2 on both an upper and rear side thereof. In addition, a front protector 34 and a front carrier 35 formed mainly of steel material are mounted to the front portion of the vehicle body frame 4. A rear fender 36 is formed of resin and covers both of the rear wheels 3 on both an upper and front side thereof, and a rear carrier 37, formed mainly of steel material is mounted along with the rear fender 36 to the rear portion of the vehicle body frame 4. A mount bracket 38a, extending rearward, and a so-called trailer hitch 38, mainly including a hitch ball 38b which is supported thereby, are mounted to the rear end portion of the lower portion of the vehicle body frame 4.

Figure 3:
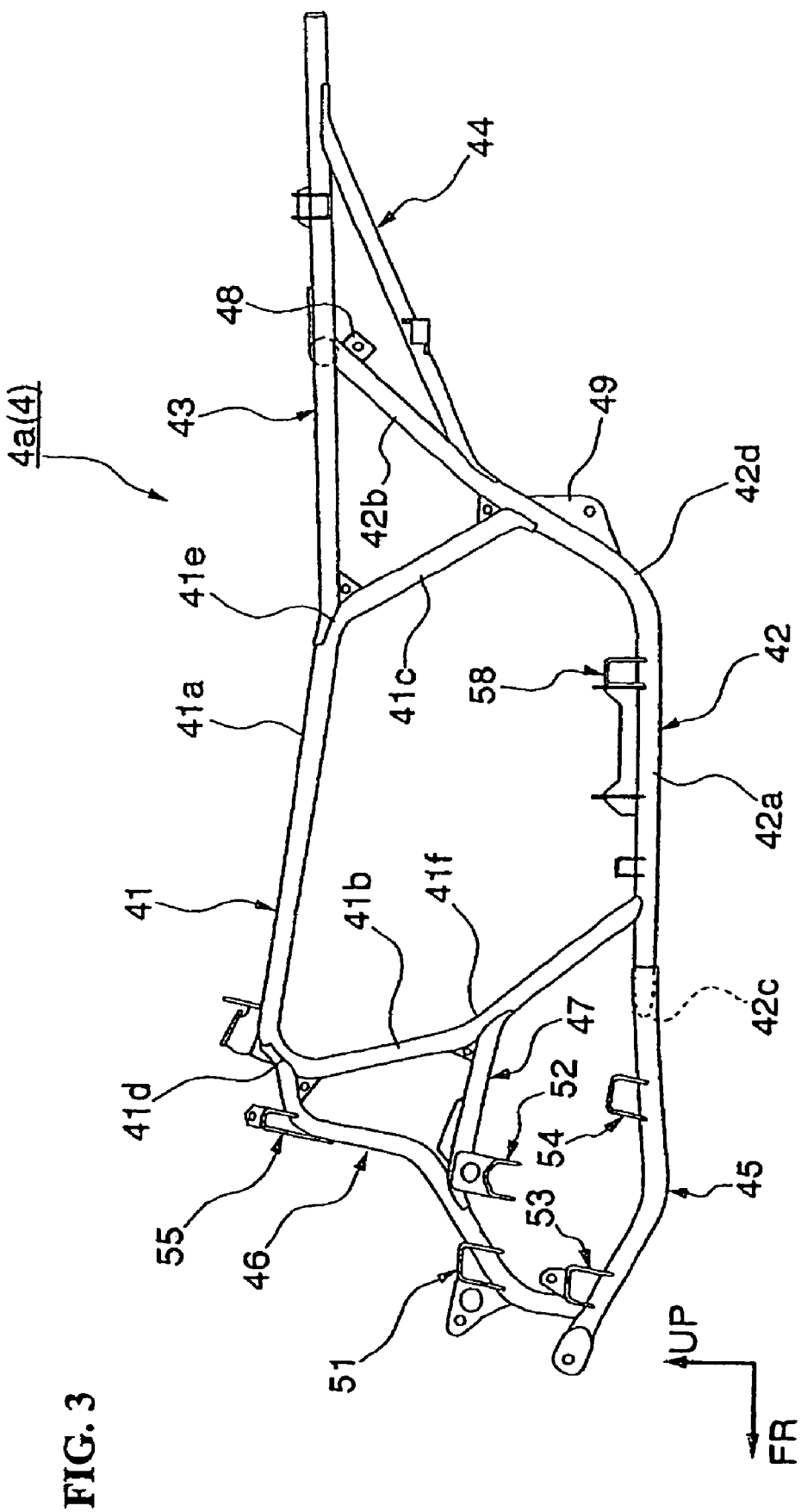
FIG. 3 is a side view of a frame body of a vehicle body frame of the saddle-type four-wheel vehicle.

Referring also to FIG. 3, the frame body 4a of the vehicle body frame 4 is formed of plural types of steel members integrally joined by welding or the like. To be more specific, the vehicle body frame 4 forms a pair of left and right closed loop structures including mainly left and right upper pipes 41 and lower pipes 42, and is formed by joining these members with a plurality of cross members into a box structure extending longitudinally in the longitudinal direction at the widthwise center portion of the vehicle. Hereinafter, the left side of the vehicle body frame 4 shown in FIG. 3 will be described unless otherwise specified, and the description on the right side of the vehicle body frame 4 will be omitted since it is symmetrical to the left side.

The upper pipe 41 is integrally formed by bending a single steel pipe, and includes an upper inclined portion 41a arranged obliquely so as to extend slightly downward toward the rear on the outside of the upper portion of the vehicle body frame 4, a front inclined portion 41b extending from the front end portion of the upper inclined portion 41a obliquely rearward and downward at an acute angle thereto, and a rear inclined portion 41c extending from the rear end portion of the upper inclined portion 41a obliquely rearward and downward at an obtuse angle thereto. A front bent portion 41d is formed between the upper inclined portion 41a and the front inclined portion 41b of the upper pipe 41, a rear bent portion 41e is formed between the upper inclined portion 41a and the rear inclined portion 41c, and an intermediate bent portion 41f which is a protrusion toward the front is formed at substantially center portion of the front inclined portion 41b.

In addition, the lower pipe 42 is integrally formed by bending a single steel pipe, and includes a lower horizontal portion 42a which is arranged substantially in the horizontal direction on the outside of the lower portion of the vehicle body frame 4, a rear inclined portion 42b extending from the rear end portion of the lower horizontal portion 42a obliquely upward and rearward at an obtuse angle. The left and right lower pipes 42 are connected continuously at the front end portion (the front end portion of the lower horizontal portion 42a) by way of an arcuate portion 42c (see FIG. 2) protruding toward the front in top view provided so as to form an integral structural body with the left and right lower pipes 42. A lower bent portion 42d is formed between the lower horizontal portion 42a and the rear inclined portion 42b of the lower pipe 42.

The lower end portion of the front inclined portion 41b of the upper pipe 41 is joined to the lower horizontal portion 42a of the lower pipe 42 in the vicinity of the front end portion thereof. The lower end portion of the rear inclined portion 41c of the upper pipe 41 is joined to the rear inclined portion 42b of the lower pipe 42 at a vertically intermediate portion thereof. A lower frame bracket 49 is provided on the lower pipe 42 immediately upward of the lower bent portion 42d of the rear inclined portion 42b of the lower pipe 42, and a lower frame connecting portion 65 of the sub-frame 60 is connected to the lower frame bracket 49.

The front end portion of a rear upper pipe 43 provides a seat rail arranged substantially in the horizontal direction, and is joined to the rear bent portion 41e of the upper pipe 41. The upper end portion of the rear inclined portion 42b of the lower pipe 42 is joined to the longitudinally intermediate portion of the rear upper pipe 43. A rear sub-frame pipe 44 inclining upward toward the rear extends between the vertically intermediate portion of the rear inclined portion 42b of the lower pipe 42 and the portion in the vicinity of the rear end portion of the rear upper pipe 43. An upper frame bracket 48 is provided at the portion in the vicinity of the upper end portion of the rear inclined portion 42b of the lower pipe 42, and an upper frame connecting portion 66a of the sub-frame 60 is connected to the upper frame bracket 48.

The rear end portion of a front lower pipe 45 arranged substantially in the horizontal direction is joined in the vicinity of the front end portion of the lower horizontal portion 42a of the lower pipe 42. The front portion of the front lower pipe 45 is curved toward the obliquely upper front thereof and the lower end portion of the front protector 34 is connected to the front end portion thereof. The front protector 34 serves also as a carry pipe for supporting the front carrier 35. The lower horizontal portion 42a is provided with a step bar 56, and the step bar 56 and a step board 56a constitute a rider's step.

The upper end portion of a front shock absorber pipe 46 extending from the front bent portion 41d of the upper pipe 41 in the vicinity of the front end portion of the front lower pipe 45 is connected to the front bent portion 41d. The front shock absorber pipe 46 is bent into a gradual crank shape as viewed in a side view, and the lower end portion thereof is joined in the vicinity of the front end portion of the front lower pipe 45. A front sub-frame pipe 47 inclined slightly upward toward the front extends between the vertically intermediate portion of the front shock absorber pipe 46 and the intermediate bent portion 41f of the upper pipe 41.

Here, laterally extending intermediate front cross member 51 and upper cross member 55 are extended between the left and right front shock absorber pipes 46, respectively. In the same manner, a lower front cross member 53 and a lower rear cross member 54 are extended between the left and right front lower pipes 45, and an intermediate rear cross member 52 extends between the left and right front sub-frame pipes 47.

The front and rear on the proximal end sides of the left and right upper arms (not shown in the drawing) of a front suspension 57 are supported at both side portions of the intermediate front and rear cross members 51, 52 so as to be capable of swinging in the vertical direction. The front and rear on the proximal end sides of the left and right lower arms (not shown in the drawing) are supported at both side portions of the lower front and rear cross members 53, 54 so as to be capable of swinging in the vertical direction. The upper and lower ends of the left and right knuckles (not shown in the drawing) are supported at the distal end sides of both the upper arms and the lower arms so as to be capable of swinging in the vertical direction, and hub portions of the left and right front wheels 2 are rotatably supported by both knuckles. Left and right front shock absorber units 58 are interposed between both lower arms and both end portions of the upper cross member 55.

Figure 4:
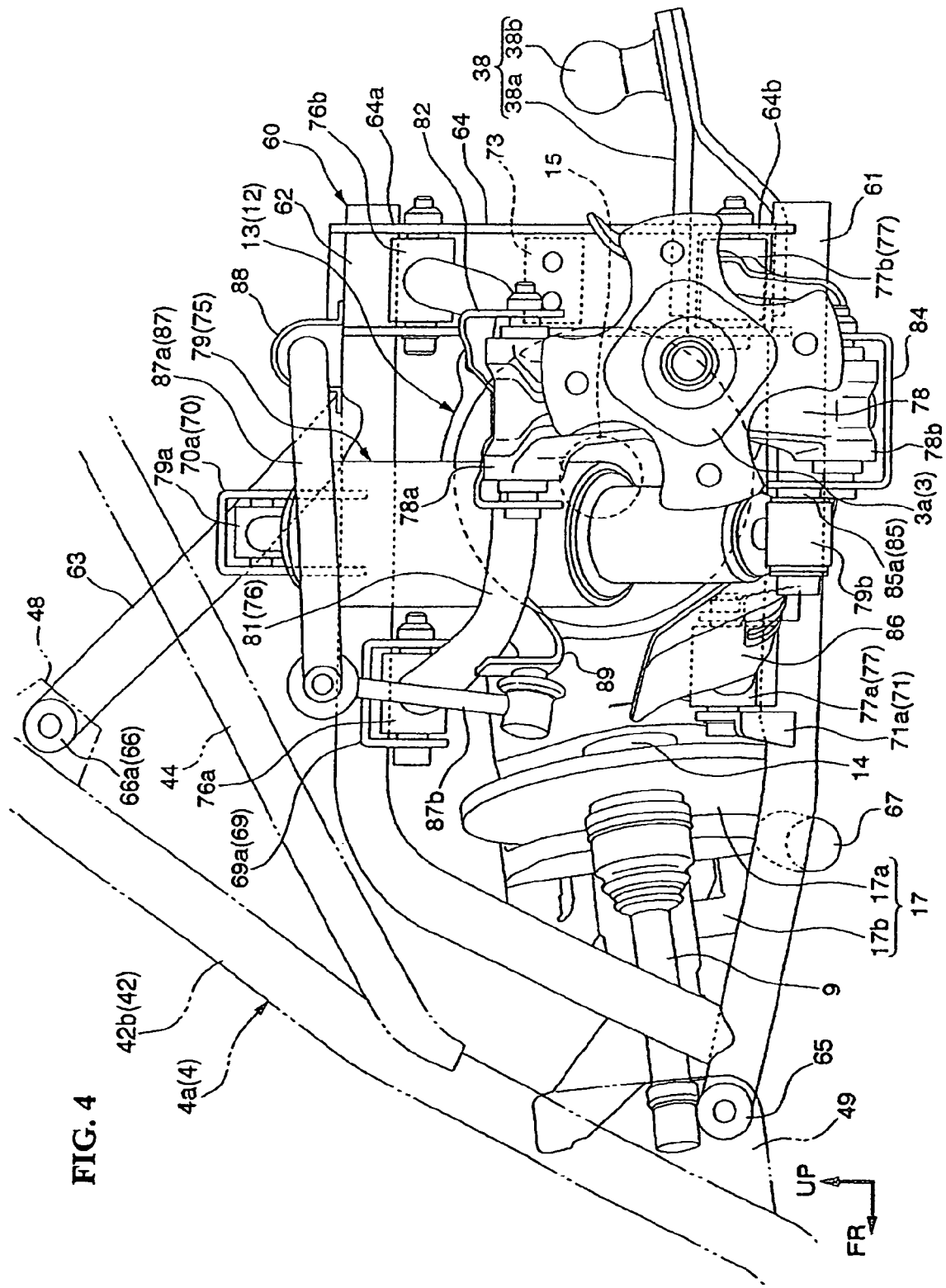
FIG. 4 is a side view around a rear suspension of the saddle-type four-wheel vehicle.

As shown in FIG. 4, a sub-frame 60 is formed by integrally joining plural types of steel members by welding or the like in the same manner as the frame body 4a. To be more specific, the sub-frame 60 mainly includes left and right sub-frame lower pipes 61 obliquely extending slightly and downwardly toward the rear from the lower frame connecting portion 65, left and right sub-frame upper pipes 62 extending obliquely upward from the vicinity of the front end portion of both sub-frame lower pipes 61, then being bent rearward substantially in parallel with the sub-frame lower pipes 61, left and right extension pipes 63 extending obliquely upward toward the front from the upper sides of the rear portions of both sub-frame upper pipes 62, and left and right rear members 64 extending vertically between the sub-frame upper pipes 62 and the sub-frame lower pipes 61 in the vicinity of end portions thereof to form a pair of left and right closed loop structural body. The sub-frame 60 is formed into a box structure continuously extending to the rear portion of the frame body 4a at an intermediate portion in the vehicle width direction by joining these members with a plurality of cross members. Hereinafter, the left side of the sub-frame 60 shown in FIG. 4 will be described unless otherwise specified, and the description on the right side of the sub-frame 60 will be omitted since it is symmetrical to the left side.

Figure 5:
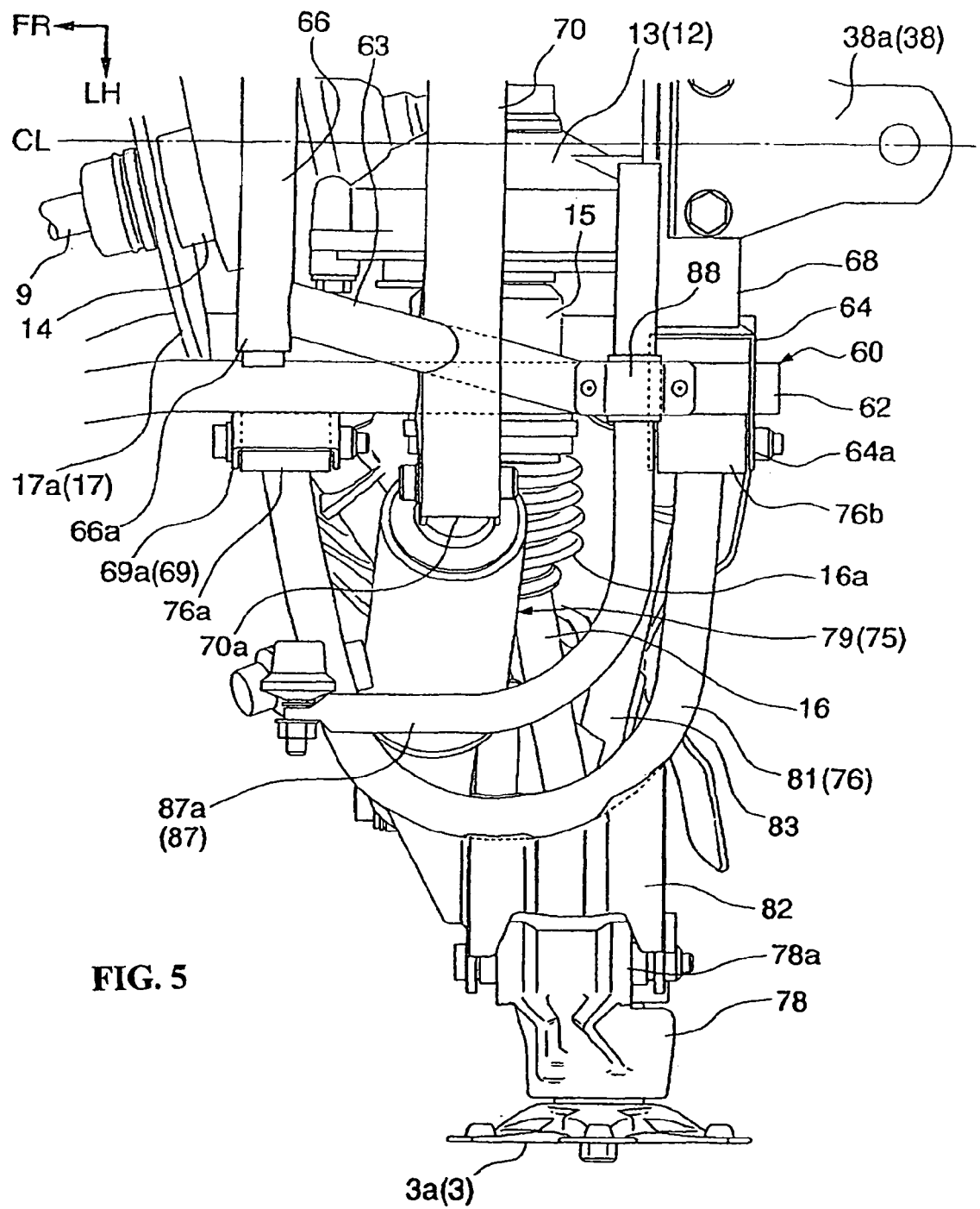
FIG. 5 is a top view showing the periphery of the rear suspension.
Figure 6:
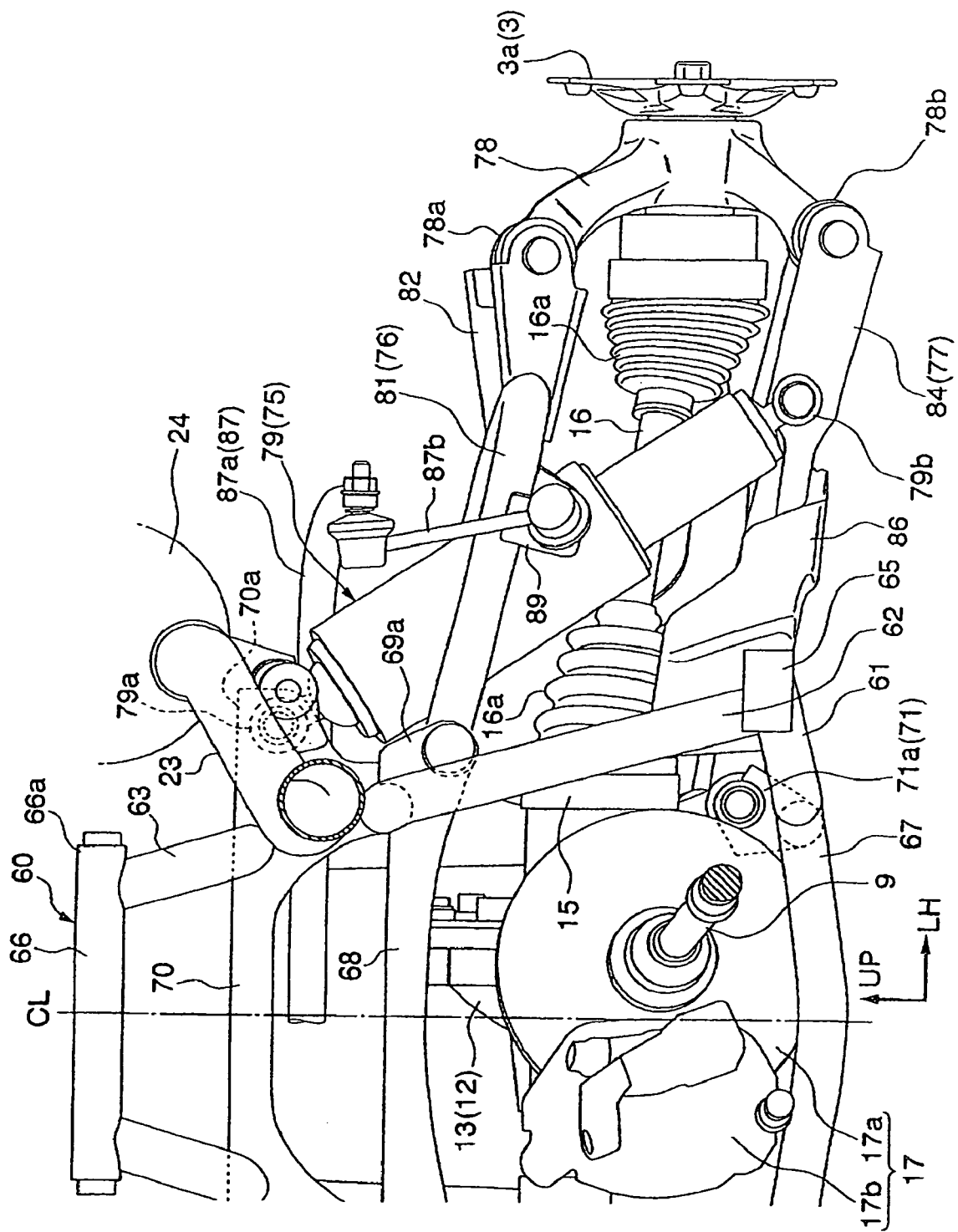
FIG. 6 is a front view showing the periphery of the rear suspension.
Figure 7:
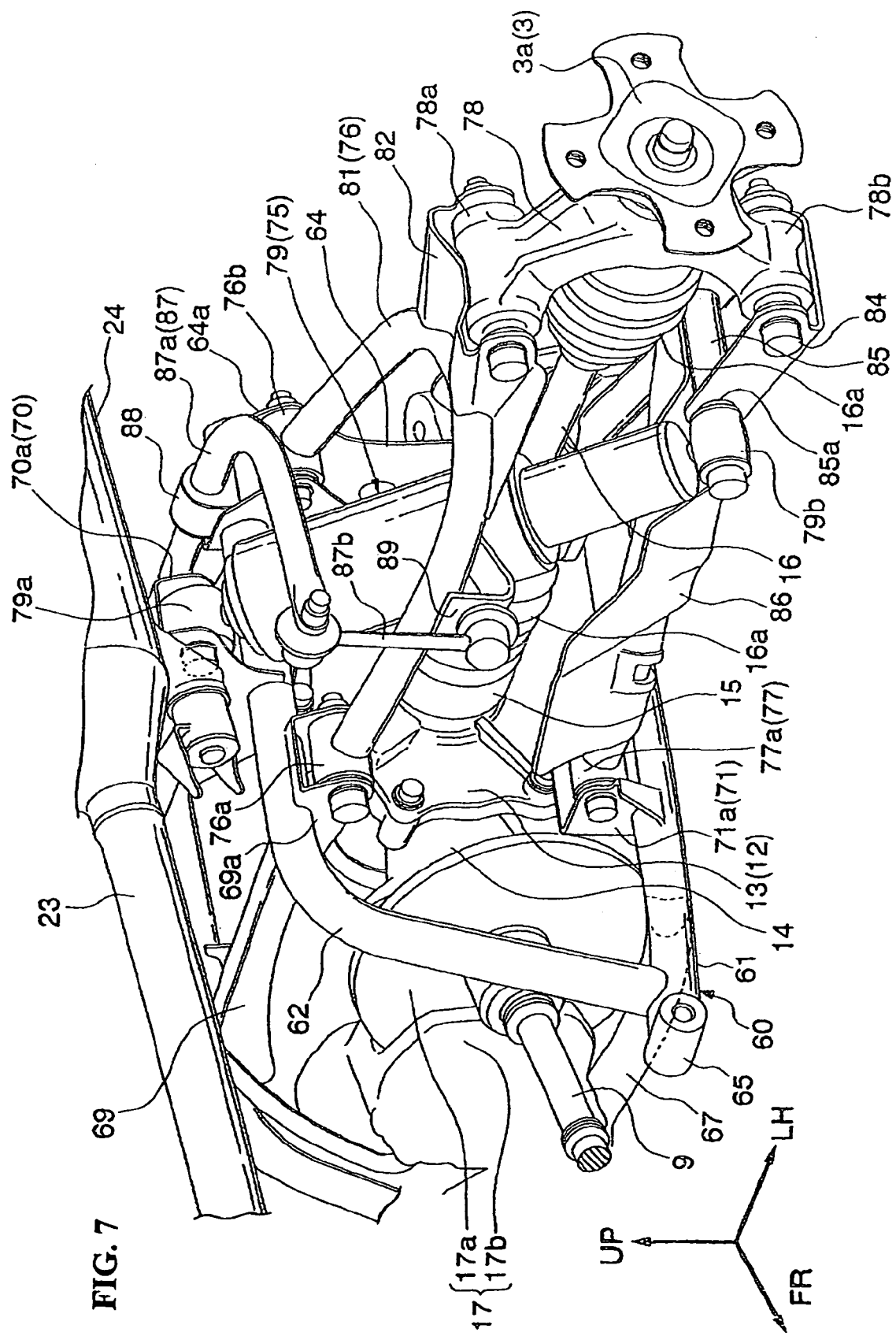
FIG. 7 is a perspective view of the periphery of the rear suspension.

Referring also to FIG. 5 to FIG. 7, the sub-frame lower pipe 61 is formed of a round steel pipe, and the short, pipe-shaped, lower frame connecting portion 65 is joined to the front end portion of the sub-frame lower pipe 61 so as to extending along the lateral direction of the vehicle. The lower frame connecting portion 65 is connected and fixed to the lower frame bracket 49 by way of a connecting shaft, such as a bolt extending in the lateral direction. A chain line CL in FIGS. 5 and 6 indicates the widthwise center of the vehicle body.

The sub-frame lower pipe 61 extends obliquely downward toward the rear and laterally inward from the lower frame connecting portion 65, and then is bent at the longitudinally intermediate portion thereof and extends generally rearward along the longitudinal direction. The rear portion of the sub-frame lower pipe 61 is positioned at a position lower than a rear output portion 15 of the rear terminal gear case 12 and substantially at the same level as the lower end portion of a casing 13. The front end portion of the sub-frame upper pipe 62 is joined to the upper surface of the portion in the vicinity of the front end portion of the sub-frame lower pipe 61 by welding so as to be disposed immediately rearward of the lower frame connecting portion 65.

The sub-frame upper pipe 62 is formed of a round steel pipe having substantially the same diameter as the sub-frame lower pipe 61, and extends from the front end portion thereof (the joint portion with the sub-frame lower pipe 61) obliquely upward toward the rear and laterally inwardly and is bent at the longitudinally intermediate portion thereof toward the rear substantially along the longitudinal direction. The rear portion of the sub-frame upper pipe 62 is positioned upwardly of the rear output portion 15 of the rear terminal gear case 12 and slightly upwardly of the upper end portion of the casing 13. The lower end portion of the extension pipe 63 is joined to the upper-surface side of the rear portion of the sub-frame upper pipe 62 by welding. For the sake of convenience of illustration, the extension pipe 63 is omitted in FIG. 7.

The extension pipe 63 is formed of a round steel pipe of the same diameter as respective pipes shown above, and extends obliquely upwardly toward the front and laterally inwardly from the lower end portion thereof (the joint portion with respect to the sub-frame upper pipe). The upper end portion of the extension pipe 63 is integrally joined in the vicinity of the side end portion of a laterally extending top cross member 66 by welding. The top cross member 66 is formed of a round steel pipe of substantially the same diameter as the extension pipe 63, and the left and right extension pipes 63 are integrally joined to each other by way of the top cross member 66 between the upper end portions.

Figure 9:
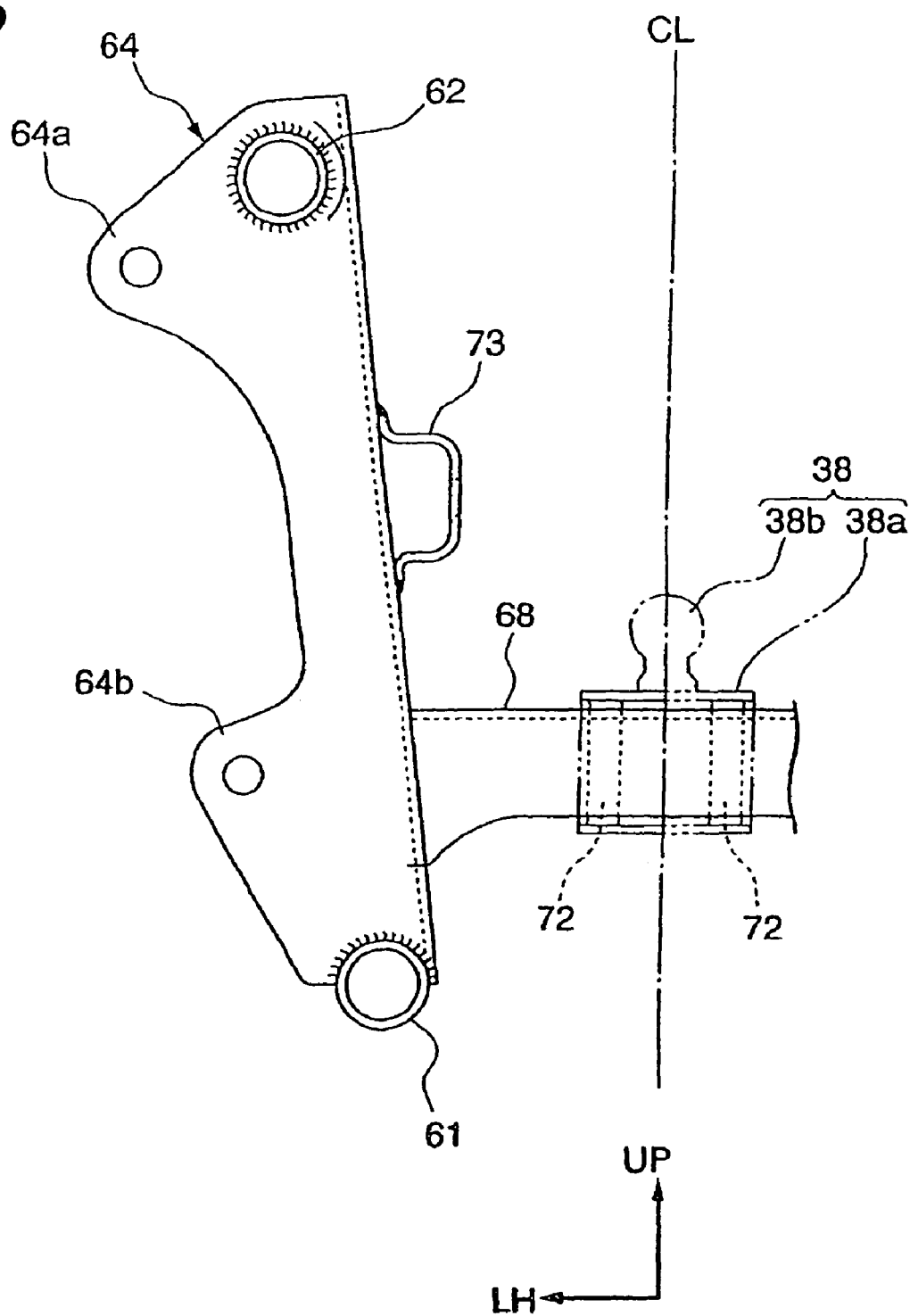
FIG. 9 is a back view of the rear portion of a sub-frame of the vehicle body frame.

Referring also to FIG. 9, the rear member 64 is formed substantially into an angular C-shape in cross section, the C-shape opening toward the laterally outside. The rear member 64 extends vertically, and the rear end portion of the sub-frame upper pipe 62 is fitted in the vicinity of the upper end portion of the rear member 64 so as to penetrate through an opening formed in the rear member 64, and, in such a state, these members are joined to each other by welding. The lower end portions of the rear member 64 are joined to each other by welding in a state that the lower end portion is aligned with the upper surface of the sub-frame lower pipe 61, which is arranged in the vicinity of the rear end portion of the sub-frame lower pipe 61. As seen in FIG. 9, the lower end of the rear member 64 conforms to the shape of the outer periphery of the sub-frame lower pipe 61, and is welded thereto. The sub-frame upper pipe 62 and the sub-frame lower pipe 61 are connected between the rear end portions thereof with respect to each other by the rear member 64, and a closed loop structure as viewed in a side view of the sub-frame 60 is formed. It is also possible to employ a constitution in which these members are joined with each other by welding in a state that the lower end portion of the rear member 64 is fitted to the sub-frame lower pipe 61 so as to penetrate therethrough.

Here, a laterally extending front lower cross member 67 extends between the longitudinally intermediate portions of the left and right sub-frame lower pipes 61. In the same manner, a rear lower cross member 68 extends between the left and right rear members 64 in the vicinity of the lower end portion thereof, a front upper cross member 69 extends between the left and right sub-frame upper pipes 62 in the vicinity of the longitudinally intermediate portions thereof, a center upper cross member 70 extends between the left and right extension pipes 63 at the lower portions, and the top cross member 66 extends between the left and right extension pipes 63 at the upper end portions thereof.

The front lower cross member 67 is formed of a round steel pipe of the same diameter as the sub-frame lower pipe 61, and is joined thereto by welding in a state that both end portions thereof match the inner surface of the sub-frame lower pipe 61. The front lower cross member 67 is formed into a downwardly protruding curved shape so as to ensure a distance with the rear propeller shaft 9 and peripherally parts thereof.

The rear lower cross member 68 is formed substantially into an angular C-shape opened downward in cross section by bending a steel plate so as to extend laterally, and is joined to the rear member 64 by welding in a state that both ends thereof match the inner surface thereof. The rear lower cross member 68 also serves as a mounting member for the trailer hitch 38. In other words, a pair of left and right mount pipes 72 is fixed to the rear lower cross member 68 by welding so as to vertically penetrate the laterally intermediate portion, and the mount bracket 38a of the trailer hitch 38 is joined to both mount pipes 72 with bolts or the like. It is also possible to employ a configuration in which the trailer hitch 38 is directly welded to the rear lower cross member 68.

The front upper cross member 69 is formed substantially into an angular C-shape opening downward in cross section by bending a steel plate so as to extend laterally, are joined to the sub-frame upper pipes 62 by welding in a state that notches formed on the upper side at both end portions of the upper cross member 69 match the lower surface of the sub-frame upper pipes 62.

The center upper cross member 70 is formed substantially into an angular C-shape opening downward in cross section by bending a steel plate so as to extend laterally, and is joined to the extension pipes 63 and the sub-frame upper pipes 62 by welding in a state that both end portions thereof match the inner surfaces of the extension pipes 63 and the sub-frame upper pipes 62 in a straddled manner.

The top cross member 66 is formed of a round steel pipe of substantially the same diameter as the extension pipe 63, and is joined with both extension pipes 63 by welding in a state that the distal end portions of both extension pipes 63 match the lower surface at both end portions thereof. Here, the top cross member 66 constitutes the upper frame connecting portion 66a by inserting nuts to both end portions thereof or the like, and the upper frame connecting portion 66a is connected and fixed to the upper frame bracket 48 by way of a connecting shaft such as a bolt or the like extending in the lateral direction.

Both end portions of the front upper cross member 69 project outwardly of the sub-frame upper pipe 62 in the lateral direction to form a front upper arm supporting portion 69a, and a front arm connecting portion 76a of an upper arm 76 of a rear suspension 75 is swingably supported by the front upper arm supporting portion 69a by way of an upper swinging shaft extending generally along the longitudinal direction. The upper outside of the rear member 64 also projects outwardly of the sub-frame upper pipe 62 in the lateral direction to form a rear upper arm supporting portion 64a, and a rear arm connecting portion 76b of the upper arm 76 is swingably supported by the rear upper arm supporting portion 64a by way of a swinging shaft which extends coaxially with the upper swinging shaft.

A lower arm bracket 71 which is formed by bending a steel plate is joined with the longitudinally intermediate portion of the sub-frame lower pipe 61 by welding. The lower arm bracket 71 projects outwardly of the sub-frame lower pipe 61 in the lateral direction to form a front lower arm supporting portion 71a, and a front arm connecting portion 77a of a lower arm 77 of the rear suspension 75 is swingably supported by the front lower arm supporting portion 71a by way of a lower swinging shaft which extends in parallel with the upper swinging shaft. The lower outside of the rear member 64 projects also outwardly of the sub-frame lower pipe 61 in the lateral direction to form a rear lower arm supporting portion 64b and a rear arm connecting portion 77b of the lower arm 77 is swingably supported by the rear lower arm supporting portion 64b by way of a swinging shaft which extends coaxially with the lower swinging shaft.

Both end portions of the center upper cross member 70 form upper shock absorber supporting portions 70a by projecting outwardly of the sub-frame upper pipe 62 relatively significantly in the lateral direction. An upper end connecting portion 79a of a rear shock absorber unit 79 is swingably supported by the upper shock absorber supporting portion 70a by way of a connecting shaft which extends in parallel with the respective swinging shafts. Here, it can be said that both upper shock absorber supporting portions 70a are located relatively in the vicinity of an upper frame connecting portion 66a which is a mounting portion on the upper portion of the sub-frame 60 with respect to the frame body 4a.

The front and rear on the proximal end sides of the left and right upper arms 76 of the rear suspensions 75 are supported so as to be capable of swinging in the vertical direction by both end portions of the front upper cross members 69 and the upper outside portion of both rear members 64 (the front and rear upper arm supporting portions 69a, 64a). The front and rear on the proximal end sides of the left and right lower arms 77 are supported so as to be capable of swinging in the vertical direction by the outside portions of both lower arm brackets 71 and the lower outside portions of both rear members 64 (the front and rear lower arm supporting portions 71a, 64b). The upper and lower portions of left and right knuckles 78 are swingably supported by the distal end sides of both upper arms 76 and lower arms 77, and hub portions 3a of the left and right rear wheels 3 are rotatably supported by the knuckles 78. Interposed between both lower arms 77 and both end portions of the center upper cross member 70 (the upper shock absorber supporting portions 70a) are the left and right rear shock absorber units 79.

The upper arm 76 is formed by bending, for example, a round steel pipe into a substantially U-shape opening laterally inwardly in top view to form an arm body 81, and the short pipe-shaped arm connecting portions 76a, 76b extending substantially in the longitudinal direction are joined to both end portions on the opened side by welding. An upper supporting bracket 82, formed by bending a steel plate, is joined to a portion offset to the outside portion and slightly rearward by welding.

The respective arm connecting portions 76a, 76b are arranged coaxially with respect to each other, and are connected so as to be swingable with the swinging shaft in a state that the respective arm connecting portions 76a, 76b entered between the front and rear walls of the front and rear upper arm supporting portions 69a, 64a of the sub-frame 60. The upper supporting bracket 82 is formed substantially into an angular C-shape opening downward in cross section and projects outward in the lateral direction, and is connected so as to be swingable in a state that an upper connecting portion 78a of the knuckle 78 enters between the front and rear walls of the upper supporting bracket 82 by way of a connecting shaft which extends in parallel with the swinging shaft.

Figure 8:
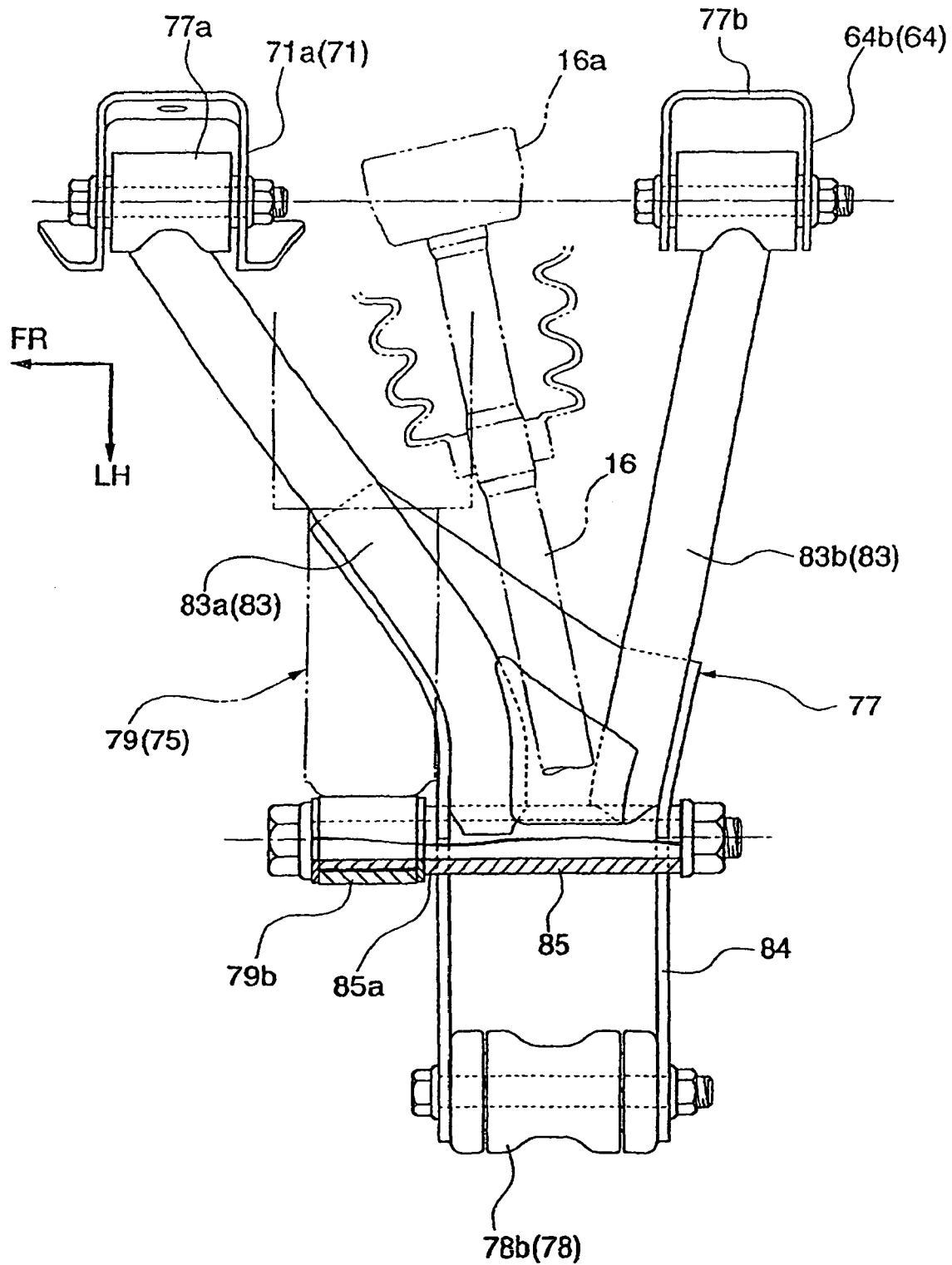
FIG. 8 is a top view of a lower arm of the rear suspension.

Referring also to FIG. 8, the lower arm 77 includes for example, front and rear arm bodies 83a, 83b formed of round steel pipes which are arranged to form substantially a V-shape opening laterally inwardly in top view to constitute an arm body 83 by integrally joining the outside portions thereof, and the short pipe-shaped front and rear arm connecting portions 77a, 77b which extend in parallel with the arm connecting portions 76a, 76b are joined by welding to both end portions on the opened side, and a lower supporting bracket 84 which is formed by bending a steel plate is joined to the out side thereof by welding.

The respective arm connecting portions 77a, 77b are arranged coaxially, and are connected so as to be swingable by way of the swinging shaft in a state that the respective arm connecting portions 77a, 77b enter between the front and rear walls of the front and rear lower arm supporting portions 71a, 64b of the sub-frame 60. The lower supporting bracket 84 is formed substantially into an angular C-shape opening upward in cross section and projects laterally outside, and is swingably connected in a state that a lower connecting portion 78b of the knuckle 78 enters between the front and rear walls of the lower supporting bracket 84 by way of a connecting shaft which extends in parallel with the swinging shaft.

The outside portion of the arm body 83 is displaced slightly rearward, and the front arm body 83a, inclined steeply with respect to the lateral direction, is formed by being bent so that the distal end side thereof extends substantially in parallel with the lateral direction thereof accordingly. The front and rear arm bodies 83a, 83b are integrally joined by welding the distal end portions thereof to the front and rear portions of a lower supporting pipe 85 formed of a round steel pipe extending in parallel with the swinging shaft. The lower supporting bracket 84 is mounted and joined by welding to the distal end sides of the front and rear arm bodies 83a, 83b so as to cover these members from below.

The lower supporting pipe 85 is joined to the lower supporting bracket 84 by welding in a state of being fitted thereto so as to penetrate the front and rear walls of the lower supporting bracket 84. A lower end connecting portion 79b of the rear shock absorber unit 79 is positioned on the front-end side of the lower supporting pipe 85 (the front surface-side of the lower arm 77), and the lower end portion thereof is swingably connected to the lower supporting pipe 85 by way of a connecting shaft 90 which extends in parallel with the swinging shaft. In other words, the lower supporting pipe 85 constitutes the lower shock absorber supporting portion 85a which supports the lower end connecting portion 79b of the rear shock absorber unit 79 together with the connecting shaft 90.

Here, since the lower supporting bracket 84 which corresponds to a knuckle supporting portion, is provided with the lower supporting pipe 85 as the damper connecting portion, the lower end connecting portion 79b of the rear shock absorber unit 79 is positioned in the vicinity of the knuckle 78. The lower supporting pipe 85, which constitutes the lower shock absorber supporting portion 85a, is provided at a level substantially the same as the lower arm 77 (in other words, a level (position) which does not protrude from the upper and lower surfaces of the lower arm 77 (the front and rear arm bodies 83a, 83b) or a level which is generally overlapped with the lower arm 77 in front view). An arm cover 86 formed of resin, for example, is mounted on the lower-surface side of the lower arm 77 so as to cover the lower arm 77 between the front and rear arm bodies 83a, 83b.

The upper arm 76 and the lower arm 77 are arranged so as to be inclined slightly with the distal end side positioned slightly downwardly in front view and substantially in parallel with each other (see FIG. 6). When an impact load or the like is supplied from a road surface to the left and right rear wheels 3, the respective rear wheels 3 and the knuckle 78 are displaced in the vertical direction, and the respective arms 76, 77 are swung in the vertical direction, so that the rear shock absorber unit 79 expands and contracts in association with the swinging motion. The load is gently absorbed by the damping action by expansion and contraction of the rear shock absorber unit 79.

A supporting bracket 73 is joined to the vertically intermediate portion of the rear member 64 on the left side of the sub-frame 60 by welding (see FIG. 4 and FIG. 9), and the rear end portion of the casing 13 of the rear terminal gear case 12 is joined to and supported by the supporting bracket 73 with a bolt or the like. The rear terminal gear case 12 is arranged in the sub-frame 60 so as to be surrounded by the various pipes, a rear input portion 14 to which the rear propeller shaft 9 is connected is provided at the front end portion of the casing 13 thereof, and left and right rear output portions 15 to which left and right rear drive shafts 16 are connected are provided at both sides of the rear portion of the casing 13.

The rotational power of the rear propeller shaft 9 supplied to the rear input portion 14 is reduced in speed by a pair of bevel gears in the casing 13, is converted in direction of rotation, and is outputted to left and right output portions. The rear input portion 14 is located substantially at the lateral center of the vehicle body, the rear output portion of the engine 5 is offset to the left side of the vehicle body, and the rear input portion 14 is provided so as to incline in top view corresponding to the rear propeller shaft 9 which extends between the rear output portion and the rear input portion 14 of the rear terminal gear case 12.

The rear terminal gear case 12 is positioned forwardly and upwardly of the hub portions 3a of the rear wheels 3, and the left and right rear drive shafts 16 extending between both rear output portions 15 and the hub portion 3a are arranged so as to be inclined respectively in plan view, and are connected to the rear output portion 15 and the hub portion 3a by way of a universal joint 16a provided to both end portions thereof. The rear drive shafts 16 are arranged obliquely so as to extend substantially in parallel with the respective arms 76, 77 in front view (FIG. 6).

The rotational power outputted to both rear output portions 15 is transmitted to the left and right rear wheels 3 by way of the left and right rear drive shafts 16, and drives the same to rotate. At immediately front of the rear input portion 14 of the rear terminal gear case 12, brake disks 17a for left and right rear wheel brakes 17 are coaxially fixed on the rear propeller shaft 9, and brake calipers 17b corresponding to the brake disks 17a are mounted inwardly of the front portion of the sub-frame 60.

The rear shock absorber units 79 are arranged obliquely so that the lower sides thereof are positioned laterally outsides in front view, and are arranged substantially along the vertical direction as viewed in a side view. The upper end connecting portion 79a of the rear shock absorber unit 79 is connected so as to be capable of swinging by way of the connecting shaft in a state of being entered between the front and rear walls of the upper shock absorber supporting portion 70a. The upper shock absorber supporting portion 70a is positioned forwardly of the front end of the lower supporting pipe 85 of the lower arm 77, and the lower end connecting portion 79b of the rear shock absorber unit 79, located downwardly of the upper shock absorber supporting portion 70a, is arranged so that the rear end surface thereof opposes the front end surface of the lower shock absorber supporting portion 85a of the lower supporting pipe 85 of the lower arm 77 (FIG. 8).

The rear shock absorber unit 79 penetrates the inner side of the upper arm 76 through the vertical direction, and is positioned in front of the rear drive shaft 16. The lower end connecting portion 79b of the rear shock absorber unit 79 is connected to the outside (front surface side) of the lower arm 77 in the vicinity of the knuckle 78.

The lower end connecting portion 79b of the rear shock absorber unit 79 is supported in a cantilevered manner on the front-surface side of the lower arm 77 by way of a connecting shaft such as an elongated bolt or the like fixed to the lower cushion supporting portion 85a therethrough in the longitudinal direction. Accordingly, the mounting and dismounting of the rear shock absorber unit 79 with respect to the lower arm 77 can be facilitated, and the mass of the vehicle body can be concentrated since the rear shock absorber unit 79 is positioned forwardly of the hub portions 3a of the rear wheels 3 (close to an intermediate portion of the vehicle body in the longitudinal direction). The supporting rigidity of the rear shock absorber unit 79 is increased by the lower end connecting portion 79b of the rear shock absorber unit 79, connected to the lower supporting pipe 85 which penetrates the lower arm 77 across the front and rear arm bodies 83a, 83b. It is also possible to employ a constitution in which the lower end connecting portion 79b of the rear shock absorber unit 79 is supported at both end portions thereof at the front and rear.

The rear drive shaft 16 is positioned overlying the lower arm 77, and a sufficient distance is ensured between the rear shock absorber unit 79 and the rear drive shaft 16 by arranging the rear shock absorber unit 79 forwardly of the lower arm 77. Therefore, the limit in layout of the rear shock absorber unit 79 with respect to the rear drive shaft 16 and the universal joint 16a is alleviated and hence, the position of the lower end of the rear shock absorber unit 79 can be moved to laterally outsides, that is, in the vicinity of the knuckle 78, so that a large shock absorber stroke of the rear suspension 75 can be ensured and the flexibility in design of shock absorber characteristics can be increased.

The rear suspension 75 here is provided with a stabilizer 87 for restraining the behavior of the left and right rear wheels 3 in order to restrain the difference in vertical movement therebetween. The stabilizer 87 includes a torsion bar 87a formed substantially into an angular C-shape in top view, and connecting rods 87b extending between both opened ends of the torsion bar 87a and the upper arm 76. The torsion bar 87a extends laterally above the rear portion of both sub-frame upper pipes 62, and both side portions thereof are bent forward on the left and right outsides of the rear shock absorber unit 79, whereby both sides of the rear side portion of the torsion bar 87a are rotatably supported on both sub-frame upper pipes 62 by way of a holder 88 (FIG. 7).

The upper end portions of the connecting rods 87b are swingably connected to both end portions of the torsion bar 87a by way of ball joints and the lower end portions of the connecting rods 87b are swingably connected to connecting brackets 89 projecting downward from the outsides of the front portion of the upper arm 76 by way of the ball joints. Accordingly, when one of the rear wheels 3 is moved in the vertical direction, a torsion stress of the torsion bar 87a acts to cause the same vertical movement in the other rear wheel 3.

When manufacturing the sub-frame 60, the left and right sub-frame upper pipes 62 and the front upper cross member 69 are integrally joined by welding, and the left and right sub-frame lower pipes 61 and the front lower cross member 67 are integrally joined by welding. The lower frame connecting portions 65 are sub-assembled by welding in advance to the front ends of both sub-frame lower pipes 61.

The left and right extension pipes 63 and the top cross member 66 are integrally joined by welding, and the left and right rear members 64 and the rear lower cross member 68 are integrally joined by welding. The supporting bracket 73 for the rear terminal gear case 12 is sub-assembled to the rear member 64 by welding in advance, and the mount pipe 72 for the trailer hitch 38 is sub-assembled to the rear lower cross member 68 by welding in advance.

After having assembled and joined the above-mentioned assemblies by welding, the center upper cross member 70 is joined by welding, and the left and right lower arm brackets 71 are joined by welding whereby an integral sub-frame 60 is formed. It is also possible to assemble the sub-frame 60 in a state that the trailer hitch 38 is assembled to the rear lower cross member 68 in advance.

In this manner, by the provision of the arm supporting portions 64a, 64b of the rear suspension 75 on the upper and lower portions of the rear member 64 as a frame member of the sub-frame 60, the members which require the rigidity are formed integrally in the rear member 64 of substantially into an angular C-shape in cross section, and the relative positional accuracy is increased in comparison with the case in which the upper and lower arm supporting portions 64a, 64b are formed as separate members.

As described above, in the frame structure in the embodiment shown above in which the vehicle body frame 4 and the rear suspension 75 for suspending the left and right rear wheels 3 are provided, the rear suspension 75 includes the upper arm 76 and the lower arm 77, and one end side, for example the proximal end, of each of the arms 76, 77 is supported by the vehicle body frame 4 (the sub-frame 60). In addition, the rear member 64 extends between the sub-frame upper pipe 62 and the sub-frame lower pipe 61, which correspond to the frame members of the sub-frame 60, and the rear upper arm supporting portion 64a and the rear lower arm supporting portion 64b for supporting one end sides of the respective arms 76, 77 are provided on the rear member 64.

In this constitution, the rigidity of the sub-frame 60 as the rear suspension supporting part of the vehicle body frame 4 is easily ensured by connecting the sub-frame upper pipe 62 and the sub-frame lower pipe 61 using the rear member 64. The accuracy in the positioning of the respective arm supporting portions 64a, 64b is easily ensured by providing the rear upper arm supporting portion 64a and the rear lower arm supporting portion 64b for supporting the upper arm 76 and the lower arm 77 on the single rear member 64.

In the frame structure as described above, the rigidity of the rear member 64 is obtained in a simple constitution, and the shape which easily holds the respective arms 76, 77 is achieved by forming the rear member 64 substantially into an angular C-shape in cross section.

In addition, in the frame structure as described above, the vehicle body frame 4 (the sub-frame 60) is provided with the rear terminal gear case 12, and the rear member 64 supports the rear terminal gear case 12. Thus, the support of the rear terminal gear case 12 and the respective arms 76, 77 is concentrated on the rear member 64, which is a reinforcing member of the sub-frame 60, whereby rationalization in design of the vehicle body is achieved without necessity of dedicated members for supporting the rear terminal gear case 12.

Furthermore, in the frame structure as described above, a structure in which the rigidity at the joined portion between the rear member 64 and the sub-frame upper pipe 62 is ensured easily is achieved by the rear member 64 fitted to the sub-frame upper pipe 62.

In addition, in the frame structure as described above, the support of the trailer hitch 38, which requires rigidity, is concentrated on the rear member 64, since the trailer hitch 38, as an accessory part of the vehicle body, is supported by the rear member 64 whereby rationalization in design of the vehicle body is achieved.

In addition, in the frame structure as described above, the sub-frame upper pipe 62, the sub-frame lower pipe 61 and the rear member 64 are provided on the left and right sides. In addition, the rear lower cross member 68, as the mounting member of the trailer hitch 38, extends between the left and right rear members 64, and the respective rear members 64 are mounted to the respective pipes 61, 62 in a state that the left and right rear members 64 are connected by way of the rear lower cross member 68. In this structure, the left and right rear members 64 and the rear lower cross member 68 are sub-assembled in advance when integrally assembling the sub-frame upper pipes 62, the sub-frame lower pipes 61, the rear members 64 and the rear lower cross member 68, whereby assembly of the sub-frame 60 is easily achieved.

In the frame structure as described above, the vehicle body frame 4 is provided with the frame body 4a, and the sub-frame 60 which constitutes a body separate from the frame body 4a. The sub-frame 60 includes the sub-frame upper pipes 62 and the sub-frame lower pipes 61, the rear members 64 and the rear lower cross member 68. The center upper cross member 70 is provided so as to extend between the left and right upper pipes 61. In addition, the upper frame connecting portion 66a is located in the vicinity of the center upper cross member 70 and provides the mounting portion of the sub-frame 60 with respect to the frame body 4a, whereby the reinforcing function of the upper frame connecting portion 66a as the mounting portion with respect to the frame body 4a is concentrated on the center upper cross member 70 as the reinforcing member of the sub-frame 60 and hence, rationalization in design of the vehicle body is achieved.

Figure 10:
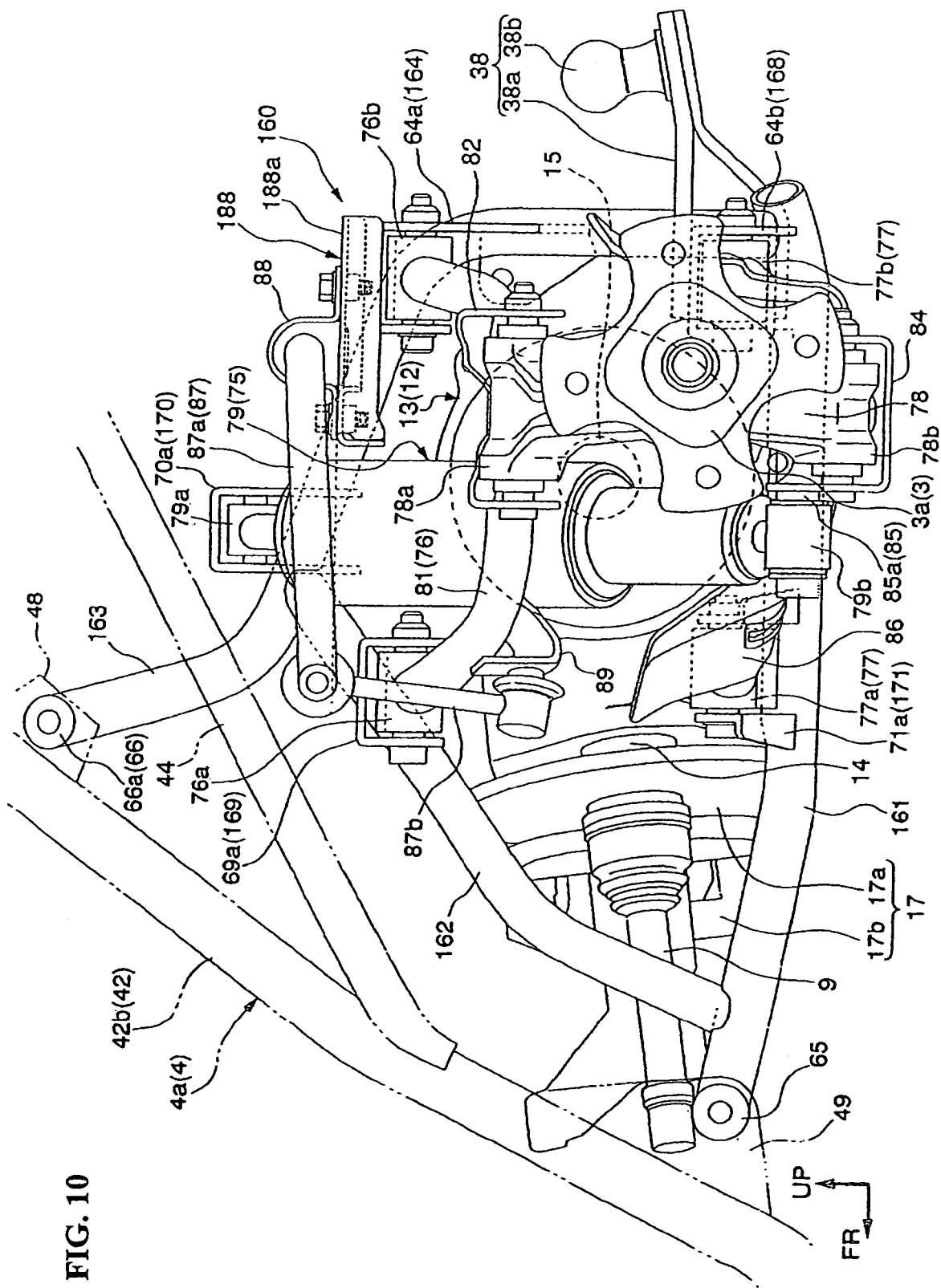
FIG. 10 is a side view corresponding to FIG. 4 in the second embodiment.
Figure 11:
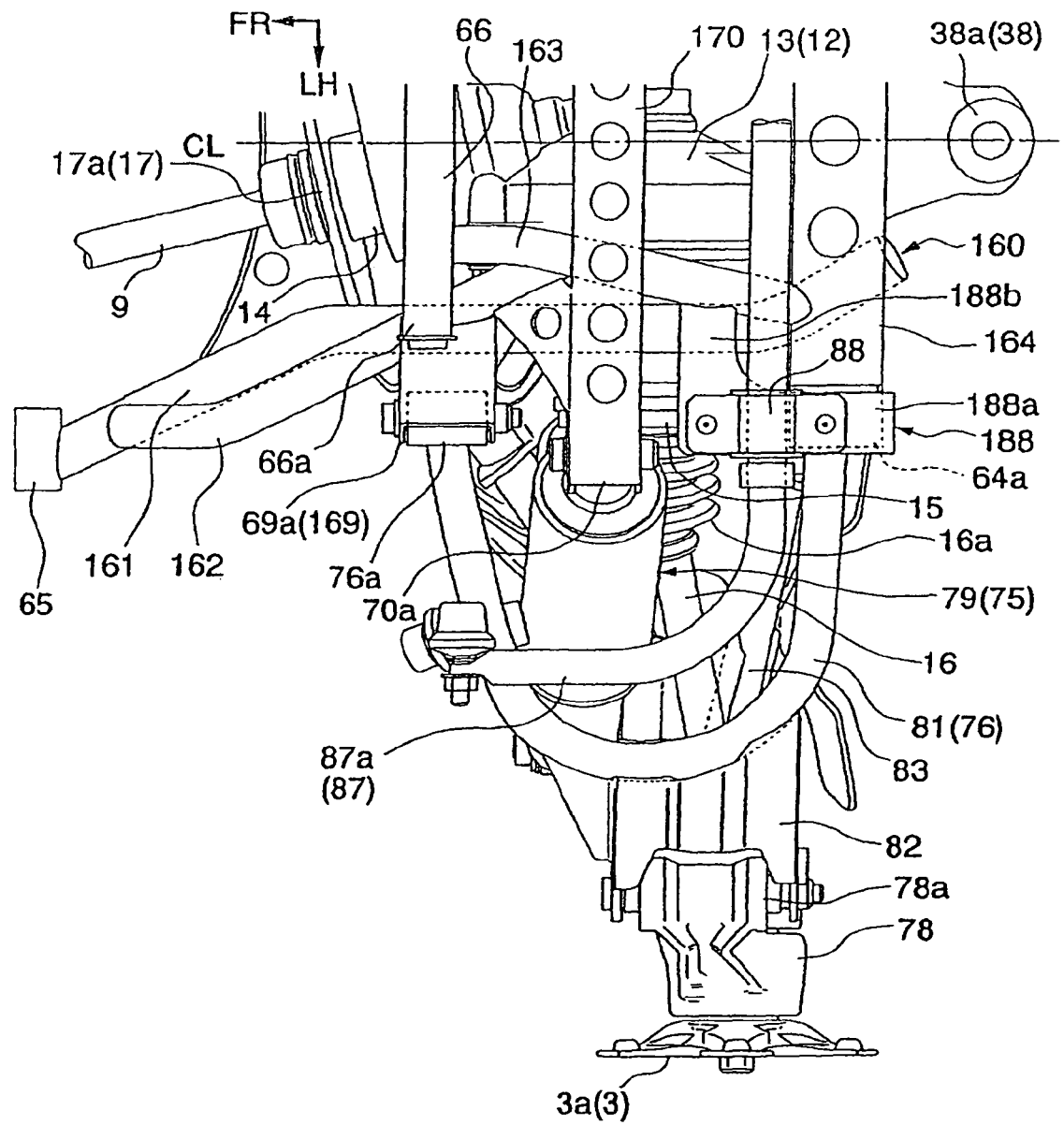
FIG. 11 is a plan view corresponding to FIG. 5 in the second embodiment.
Figure 12:
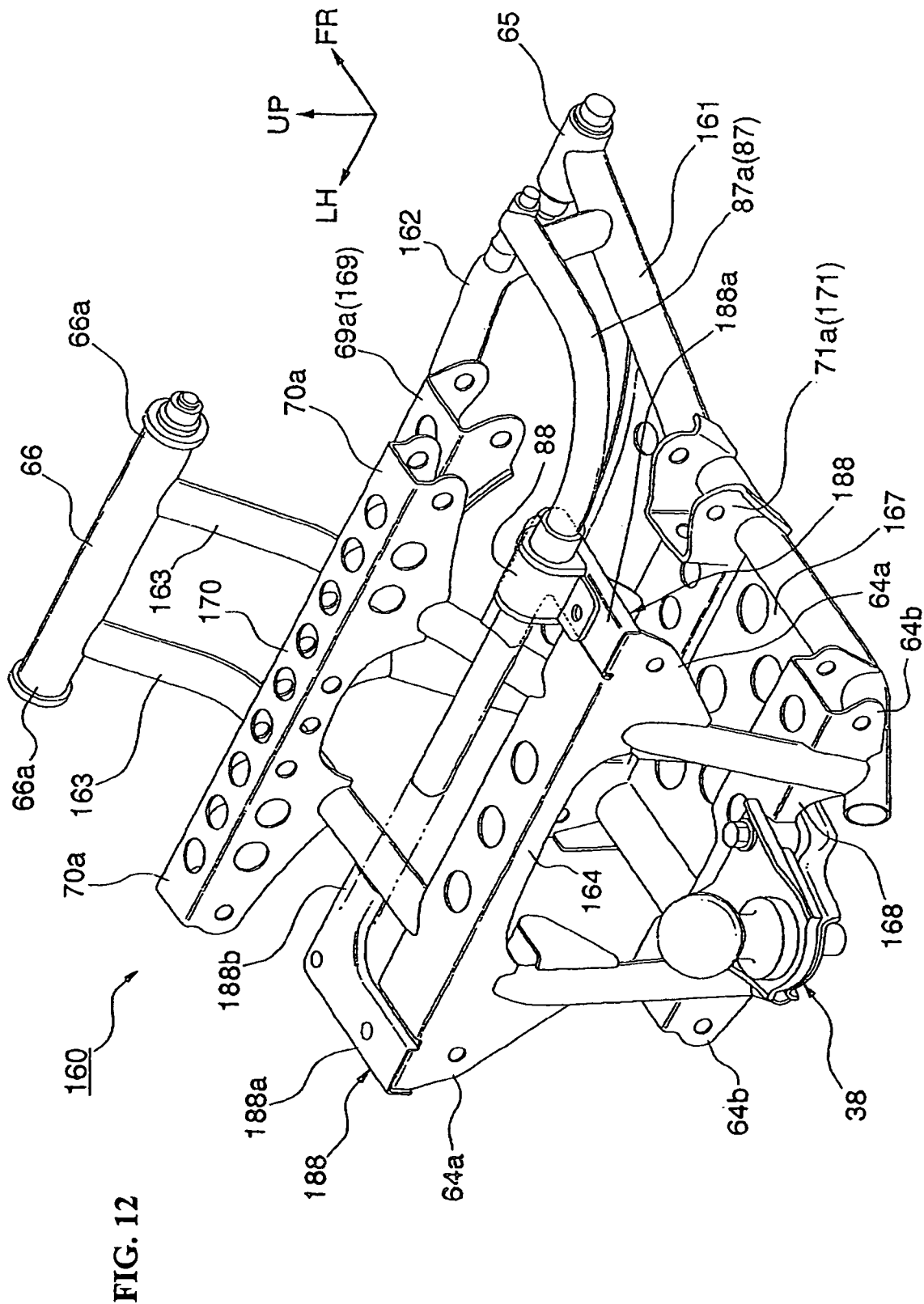
FIG. 12 is a perspective view which views a sub-frame and the like in the second embodiment from oblique rear and above.

Next, a second embodiment of the invention is hereinafter explained in conjunction with FIG. 10 to 12.

The second embodiment differs from the above-mentioned first embodiment in that a sub-frame 160 is adopted in place of the sub-frame 60. In the following description of the second embodiment, parts identical with the parts shown in the first embodiment are given the same symbols and corresponding explanation is omitted.

The sub-frame 160 is integrally connected to a rear portion of the frame body 4a in the same manner as the above-mentioned sub-frame 60, and suspends the left and right rear wheels 3 by way of the rear suspensions 75 of the independent suspension type (double wishbone type).

The sub-frame 160 is integrally formed by joining plural kinds of steel members by welding or the like. To be more specific, the sub-frame 160 mainly includes left and right sub-frame lower pipes 161 which extend rearwardly in a slightly downward and rearward extending state from the lower frame connecting portion 65, and left and right sub-frame upper pipes 162 which extend obliquely in the upward toward the rear from the vicinity of the front end portion of both sub-frame lower pipes 161. The sub-frame 160 also includes left and right sub-upper rear pipes 163 which extend obliquely in the downward and rearward direction from the vicinity of the upper frame connecting portion 66a (top cross member 66) to form a pair of left and right closed loop structures, and these closed loop structures are formed into the box structure which is contiguously formed with the rear portion of the frame body 4a by integrally joining these closed loop structures by way of a plurality of cross members.

The sub-frame lower pipe 161 is formed of a round steel pipe, and the above-mentioned lower frame connecting portion 65 is joined by welding to a front end portion of the sub-frame lower pipe 161. The sub-frame lower pipe 161 extends obliquely in the downward rearward direction and in the laterally inward direction from the lower frame connecting portion 65 and then is bent, and makes the gentle inclination thereof as viewed in a side view and, at the same time, extends generally rearwardly along the longitudinal direction as viewed in a top plan view. A front end portion of the sub-frame upper pipe 162 is joined by welding to an upper surface side of the vicinity of the front end portion of the sub-frame lower pipe 161, at a location directly behind the lower frame connecting portion 65.

The sub-frame upper pipe 162 is formed of a round steel pipe having substantially the same diameter as the sub-frame lower pipe 161, and obliquely extends in the upward and rearward direction from the front end portion thereof, that is, from the joint portion with the sub-frame lower pipe 161. The sub-frame upper pipe is then bent, and make the gentle inclination thereof as viewed in a side view and, at the same time, extends obliquely in the laterally inward direction as viewed in a top view. A rear end portion of the sub-frame upper pipe 162 is joined to the intermediate portion of the sub-upper rear pipe 163 by welding.

The sub-upper rear pipe 163 is formed of a round steel pipe of substantially the same diameter as respective pipes 161 and 162, and extends obliquely in the downward and the rearward direction from the lateral inside of the above-mentioned top cross member 66 and then is bent, and makes the gentle inclination thereof as viewed in a side view and, at the same time, obliquely extends in the laterally outward direction as viewed in a top view, and thereafter, is bent again and extends generally in the vertically downward direction. The lower end portion of the sub-upper rear pipe 163 is joined to the top surface side of the vicinity of the rear end portion of the sub-lower pipe 161 by welding.

A laterally extending center upper cross member 170 extends between the vicinities of the joint portions of the left and right sub-frame upper rear pipes 163 with the sub-frame upper pipe 162. The center upper cross member 170 is formed substantially into an angular C-shape opening downwardly, and is joined to the left and right sub-frame upper rear pipes 163 by welding in a state that the center upper cross member 170 is fitted into the left and right sub-frame upper rear pipes 163 from above. The end portions of the center upper cross member 170 extend laterally toward the outside of the left and right sub-frame upper rear pipes 163, and the extended portions form the above-mentioned upper shock absorber supporting portion 70a.

A laterally extending rear upper cross member 164 extends between the vicinities of the bent portion of the rear portions of the left and right sub-frame upper rear pipes 163. The rear upper cross member 164 is formed substantially into an angular C-shape opening downwardly, and is joined to the left and right sub-frame upper rear pipes 163 by welding in a state that the rear upper cross member 164 is fitted into the left and right sub-frame upper rear pipes 163 from above. Both side portions of the rear upper cross member 164 extend laterally toward the outside of the left and right sub-frame upper rear pipes 163, and the extended portions form the above-mentioned rear upper arm supporting portion 64a.

A laterally extending rear lower cross member 168 extends between the vicinities of the rear end portion of the left and right sub-frame lower pipes 161. The rear lower cross member 168 is formed substantially into an angular C-shape opening downwardly, and is joined by welding to the left and right sub-frame lower pipes 161 and the left and right sub-frame upper rear pipes 163 while being astride the left and right sub-frame lower pipes 161 and the left and right sub-frame upper rear pipes 163 in a state that the rear lower cross member 168 is fitted into the left and right sub-frame lower pipes 161 from above and, at the same time, is fitted into the lower end portion of the left and right sub-frame upper rear pipes 163 from a front side. Both end portions of the rear lower cross member 168 project laterally toward outside from the left and right sub-frame upper rear pipes 163, and the projecting portions form the above-mentioned rear lower arm supporting portion 64b. Here, the rear lower cross member 168 also functions as a mounting member of the trailer hitch 38.

An upper arm bracket 169 which forms the front upper arm supporting portion 69a is joined to the upper portions of the left and right sub-frame upper pipes 162 by welding. Further, a lower arm bracket 171 which forms the front lower arm supporting portion 71a is joined to the intermediate portions of the left and right sub-frame lower pipes 161 by welding. An under plate 167 which suppresses a splash or the like from a ground to the rear terminal gear case 12 is provided in the inside of the sub-frame 160 and extends between the left and right sub-frame lower pipes 161.

A pair of left and right stabilizer holding brackets 188, which hold the left and right holders 88 and the stabilizer 87 is provided on an upper side of the rear portion of the sub-frame 160. The stabilizer holding bracket 188 is a steel-plate member which includes a side portion 188a which is generally arranged along the longitudinal direction and a front-side portion 188b which extends to a lateral inside from a front side of the side portion 188a, and is formed into an approximate L shape as viewed in a top view. The stabilizer holding bracket 188 mounts short flanges which extend downwardly thereon in an erected manner from an outer periphery of the above-mentioned L-shape approximately horizontal flat-plate portion.

The rear upper arm supporting portions 64a of the rear upper cross member 164 are positioned below the rear side of the side portions 188a of the stabilizer holding brackets 188, and the rear upper cross member 164 and the stabilizer holding brackets 188 are integrally joined to each other by welding. Further, the left and right inside ends of the front portions 188b are arranged adjacent to the sub-frame upper rear pipes 163, and the front portions 188b and the sub-frame upper rear pipes 163 are integrally joined to each other by welding. That is, the stabilizer holding brackets 188 are provided astride the rear upper arm supporting portion 64a and the sub-frame upper rear pipes 163. The holder 88 is fastened by means of bolts or the like on an upper surface side of the side portions 188a of the stabilizer holding brackets 188 using bolts or the like and hence, both the left and right sides of the stabilizer 87 are rotatably supported on the left and right sub-frame upper rear pipes 163. Here, it may be possible to adopt the constitution in which at least one of the sub-frame upper rear pipes 163 (frame members) and the rear upper arm supporting portions 64a (arm supporting portions) is integrally formed with the stabilizer holding brackets 188 (stabilizer holding portions).

As explained above, according to the second embodiment, in the frame structure in which one end sides of the left and right respective arms 76, 77 of the rear suspension 75 are supported by the respective arm supporting portions 64a, 64b, 69a and 71a of the vehicle body frame 4 (the sub-frame 160), the fame structure includes the stabilizer 87 which extends between the left and right upper suspension arms 76 and the stabilizer holding brackets 188 which hold the intermediate portion of the stabilizer 87, and the stabilizer holding brackets 188 are provided astride the sub-frame upper rear pipes 163 of the vehicle body frame 4 (the sub-frame 160) and the rear upper arm supporting portion 64a and hence, the rear upper arm supporting portion 64a and the stabilizer holding brackets 188 reinforce each other. Accordingly, it is possible to easily ensure the rigidity of the sub-frame 160 which constitutes the rear suspension supporting portion of the vehicle body frame 4.

The invention is not limited to the above-mentioned embodiments and may include, for example, the constitution in which the lower end connecting portion 79b of the rear shock absorber unit 79 is connected to the rear surface side of the lower arm 77. Further, the invention may include the constitution in which the rear shock absorber unit 79 is interposed between the vehicle body frame 4 and the upper arm 76.

Further, the constitution of the invention may also be applicable to the front suspension 57. Here, the constitution in which a member extends between the upper and lower frame members on the front portion of the vehicle body frame 4, and the member supports the front terminal gear case 11 or the accessory part of the vehicle body such as the front protector 34 (carry pipe) may be also applicable.

The vehicle body frame 4 may be of the integral structure, and the engine 5 may be used as a part of the vehicle body frame 4 or the sub-frame may be connected to the engine 5.

The constitutions in the embodiments of the invention described above are provided for an illustrative purpose only, and are not limited to the application to the saddle-type four-wheel vehicle as a matter of course. Further, various modifications may be made without departing from the scope of the invention.

What is claimed is:

1. A frame structure for a vehicle having wheels, said frame structure comprising:
    a vehicle body frame; and
    a suspension structure for suspending one of the wheels, the suspension structure being operatively attached to the vehicle body frame and comprising upper and lower suspension arms,
    wherein the vehicle body frame comprises:
        an upper frame member;
        a lower frame member; and
        a rear bracket member fitted to the upper and lower frame members at the rear end thereof, such that the rear bracket member extends substantially vertically between the upper frame member and the lower frame member,
    wherein the upper frame member extends obliquely upwards from a front end portion of the lower frame member, and is then bent rearwardly such that a portion of the upper frame member is substantially parallel to the lower frame member;
    wherein inner ends of the respective suspension arms are operatively supported on the vehicle body frame,
    wherein the rear bracket member includes upper and lower supporting portions for supporting selected end portions of the respective suspension arms, and
    wherein the rear bracket member supports an accessory part of a vehicle body.

2. The frame structure according to claim 1, wherein the rear bracket member is formed having a substantially angular C-shape in cross section.

3. The frame structure according to claim 1, wherein the vehicle includes a terminal gear case, and the rear bracket member is configured and adapted to support a portion of the terminal gear case.

4. The frame structure according to claim 1, wherein a portion of at least one of the respective upper and lower frame members fits into the rear bracket member.

5. The frame structure according to claim 4, wherein at least one of the respective upper and lower frame members includes a bracket-engaging portion which extends through an opening formed in the rear bracket member, the opening sized to be fitted to an outer diameter of the at least one of the respective upper and lower frame members, and wherein the at least one of the respective upper and lower frame member is welded to the rear bracket member.

6. The frame structure according to claim 1, wherein the accessory part comprises a trailer hitch.

7. The frame structure according to claim 1, wherein the respective upper and lower frame members and the rear bracket member are provided on both left and right sides of the vehicle, and wherein the frame structure further comprises an accessory mounting member for supporting the accessory part of the vehicle body, said accessory mounting member extending between left and right rear bracket members, and wherein the rear bracket members are mounted on the respective upper and lower frame members in a state that the left and right rear bracket members are connected to each other by way of the accessory mounting member.

8. The frame structure according to claim 7, wherein the vehicle body frame comprises:
   a frame body, and a sub-frame which constitutes a body separate from the frame body,
   wherein the sub-frame comprises:
   the respective upper and lower frame members;
   the respective rear bracket members;
   the mounting member; and
   a shock absorber supporting member which extends between the left and right frame members,
   wherein a mounting portion of the sub-frame with respect to the frame body is provided in the vicinity of the shock absorber supporting member.

9. The frame structure according to claim 1, wherein the vehicle body frame includes a frame body and a sub-frame which constitutes a body separate from the frame body, and wherein the sub-frame comprises:
   the upper frame member provided on both left and right sides of the vehicle, respectively;
   the lower frame member provided on both left and right sides of the vehicle, respectively;
   the rear bracket member provided on both left and right sides of the vehicle, respectively;
   a shock absorber supporting member which extends laterally and is supported by the left and right upper frame members,
   wherein an upper mounting portion of the sub-frame with respect to the frame body is provided in the vicinity of the shock absorber supporting member, and a lower mounting portion of the sub-frame with respect to the body frame is provided at a front end of the left and right lower frame members.

10. The frame structure according to claim 9, wherein the frame body comprises:
    a main upper pipe provided on both left and right sides of the vehicle, the main upper pipe formed in a U-shape opening generally downwardly;
    a main lower pipe provided on both left and right sides of the vehicle, the main lower pipe extending in a longitudinal direction of the vehicle, and having respective ends of the main upper pipe fixed to an upper side thereof; and
    a rear upper pipe extending rearward from an upper side of the main upper pipe, the rear upper pipe corresponding to a vehicle seat rail,
    wherein a rear end of the main lower pipe is joined to an underside surface of the rear upper pipe at a longitudinally intermediate location of the rear upper pipe, and the upper mounting portion of the sub-frame with respect to the frame body is provided on the main lower pipe adjacent to the joint of the main lower pipe and the rear upper pipe.

11. The frame structure according to claim 1, wherein the rear bracket member is formed separately from each of the upper frame member and the lower frame member.

12. A frame structure for an all-terrain vehicle, said frame structure comprising:
    a vehicle body frame; and
    a suspension structure for suspending a rear wheel of said vehicle, the suspension structure being operatively attached to the vehicle body frame and comprising upper and lower suspension arms,
    wherein the vehicle body frame comprises:
    a lower frame member;
    an upper frame member extending obliquely upwards from a front end portion of the lower frame member, and bent rearwardly such that a portion of the upper frame member is substantially parallel to the lower frame member; and
    a rear bracket member fitted to the upper and lower frame members at the rear end thereof, such that the rear bracket member extends between the upper frame member and the lower frame member,
    wherein said rear bracket member is formed separately from each of the lower frame member and the upper frame member;
    wherein inner ends of the respective suspension arms are operatively supported on the vehicle body frame,
    wherein the rear bracket member includes upper and lower supporting portions for supporting selected end portions of the respective suspension arms, and
    wherein the rear bracket member includes a supporting bracket arranged at a vertical intermediate portion thereof; said supporting bracket being configured to support an accessory part of the vehicle.

13. A frame structure according to claim 12, wherein the rear end portion of the upper frame member is fitted in the upper end portion of the rear bracket member, and the rear end portion of the lower frame member is fitted in the lower end portion of the rear bracket member such that said rear bracket member extends substantially vertically between the upper frame member and the lower frame member.

14. A frame structure according to claim 12, wherein the vehicle body frame further comprises a seat rail; and an extension pipe extending obliquely upward from a rear portion of the upper frame member, wherein said extension pipe is operatively connected to said seat rail.

* * * * *